(12) United States Patent
Xiong et al.

(10) Patent No.: US 12,522,521 B2
(45) Date of Patent: Jan. 13, 2026

(54) SYSTEMS AND METHODS FOR DEGRADING PER- AND POLY-FLUOROALKYL SUBSTANCES

(71) Applicant: Haley & Aldrich, Inc., Burlington, MA (US)

(72) Inventors: Zhong Xiong, Irvine, CA (US); Min Ying Chu, Mesa, AZ (US); Darrin Costantini, Rochester, NY (US)

(73) Assignee: Haley & Aldrich, Inc., Burlington, MA (US)

( * ) Notice: Subject to any disclaimer, the term of this patent is extended or adjusted under 35 U.S.C. 154(b) by 0 days.

(21) Appl. No.: 17/748,821

(22) Filed: May 19, 2022

(65) Prior Publication Data

US 2022/0371920 A1 Nov. 24, 2022

Related U.S. Application Data

(60) Provisional application No. 63/190,633, filed on May 19, 2021.

(51) Int. Cl.
*C02F 1/32* (2023.01)
*C02F 1/58* (2023.01)
(Continued)

(52) U.S. Cl.
CPC .............. *C02F 1/325* (2013.01); *C02F 1/583* (2013.01); *C02F 1/66* (2013.01); *C02F 1/70* (2013.01);
(Continued)

(58) Field of Classification Search
CPC .... C02F 1/32; C02F 1/20; C02F 1/325; C02F 1/44; C02F 1/583; C02F 1/70; C02F 1/72;
(Continued)

(56) References Cited

U.S. PATENT DOCUMENTS

| 3,970,554 A | 7/1976 | Fischer et al. |
| 5,258,124 A | 11/1993 | Bolton et al. |
| 2020/0155885 A1 | 5/2020 | Strathmann et al. |
| 2020/0339450 A1 | 10/2020 | Franceschi-Hofmann et al. |
| 2021/0107816 A1 | 4/2021 | Ball |

FOREIGN PATENT DOCUMENTS

| JP | 2006-068599 A | 3/2006 |
| WO | WO-2020181141 A1 * | 9/2020 |
| WO | 2021/067786 A1 | 4/2021 |

OTHER PUBLICATIONS

Accelerated Degradation of Perfluorosulfonates and Perfluorocarboxylates by UV/Sulfite + Iodide: Reaction Mechanisms and System Efficiencies Zekun Liu, Zhanghao Chen, Jinyu Gao, Yaochun Yu, Yujie Men, Cheng Gu, and Jinyong Liu Environmental Science & Technology 2022 56 (6), 3699-3709 (11 pages) (Year: 2022).*

Destruction of Per- and Polyfluoroalkyl Substances (PFAS) with Advanced Reduction Processes (ARPs): A Critical Review Junkui Cui, Panpan Gao, and Yang Deng. Environmental Science & Technology 2020 54 (7), 3752-3766. DOI: 10.1021/acs.est.9b05565 (15 pages) (Year: 2020).*

(Continued)

*Primary Examiner* — Patrick Orme
(74) *Attorney, Agent, or Firm* — ArentFox Schiff LLP

(57) ABSTRACT

The present disclosure provides systems and methods for degrading per- and poly-fluoroalkyl substances (PFAS) using hydrated electrons generated in an ultraviolet (UV)/sulfite system. These systems and methods may be used, e.g., to remediate wastewater by destroying PFAS and co-contaminants such as chlorinated volatile organic compounds (CVOCs).

27 Claims, 8 Drawing Sheets

(51) Int. Cl.
*C02F 1/66* (2023.01)
*C02F 1/70* (2023.01)
*C02F 1/72* (2023.01)
*C02F 101/36* (2006.01)

(52) U.S. Cl.
CPC .......... *C02F 1/725* (2013.01); *C02F 2101/36* (2013.01); *C02F 2209/06* (2013.01)

(58) Field of Classification Search
CPC ............ C02F 1/722; C02F 1/725; C02F 1/76; C02F 1/78; C02F 1/66; C02F 1/685; C02F 1/727; C02F 2101/36; C02F 2103/00; C02F 2209/06; C02F 9/00; B01D 19/00; B01J 27/18; B01J 35/02; B01J 35/023; B01J 27/1815; C02B 1/36; B09C 1/08; B09C 1/06; B09C 1/002; A62D 3/35; A62D 3/36; A62D 2101/22; A62D 3/38; A62D 3/37

See application file for complete search history.

(56) References Cited

OTHER PUBLICATIONS

International Search Report and Written Opinion mailed Jul. 28, 2022 issued in corresponding PCT Application No. PCT/US2022/072439.

Liu Zekun et al: "Near-Quantitative Defluorination of Perfluorinated and Fluorotelomer Carboxylates and Sulfonates with Integrated Oxidation and Reduction", Environmental Science & Technology, vol. 55, No. 10, May 5, 2021 (May 5, 2021), pp. 7052-7062.

Nancy Merino et al: "Degradation and Removal Methods for Perfluoroalkyl and Polyfluoroalkyl Substances in Water", Environmental Engineering Science., vol. 33, No. 9, Sep. 1, 2016 (Sep. 1, 2016), pp. 615-649.

Supplementary Search Report received for European Patent Application No. 22805729.5, mailed on Sep. 9, 2024, 9 Pages.

\* cited by examiner

SYSTEMS AND METHODS FOR DEGRADING PER- AND POLY-FLUOROALKYL SUBSTANCES

CROSS-REFERENCE TO RELATED APPLICATION

This application claims the benefit of priority to U.S. Provisional Application No. 63/190,633, filed May 19, 2021, the entire content of which is incorporated herein by reference.

FIELD OF THE INVENTION

This disclosure generally relates to systems and methods for remediating contaminated liquids, and in particular to systems and methods for degrading per- and poly-fluoroalkyl sub stances.

BACKGROUND

Per- and poly-fluoroalkyl substances (PFASs) are a class of man-made compounds that have been used to manufacture various consumer products and industrial goods. PFAS may be used as surface treatment/coatings in consumer products such as carpets, upholstery, stain resistant apparel, cookware, paper, packaging, and the like, and may also be found in chemicals used for aqueous film-forming foam (AFFF), chemical plating, electrolytes, lubricants, and the like, which may eventually end up in the water supply. PFAS are bio-accumulative in wildlife and humans because they typically remain in the body for extended periods of time. Laboratory PFAS exposure studies on animals have shown problems with growth and development, reproduction, and liver damage. In view of these healthy and safety concerns, PFAS represent a liability with growing urgency, as there are thousands of industrial, military, and other sites in the U.S. that require investigation and remediation based on past manufacturing or use of PFAS at such sites.

The global environmental pollution by PFAS requires treatment and remediation technologies to be both effective and efficient. While separation methods (e.g., carbon adsorption, ion exchange, and membrane filtration) provide rapid PFAS removal from polluted water, concentrated PFAS compounds in the wastewaters from sorbent regeneration or membrane rejection must be degraded or disposed of. Furthermore, there is an increasing demand of PFAS degradation methods instead of disposal methods for the liquid containing concentrated PFAS. As the biological degradation of PFAS has not yet been shown to be effective, a variety of physicochemical approaches (e.g., electrochemical, photochemical, plasmatic, sonochemical, and radiolytic) for PFAS destruction have been under development. These technologies utilize reductive and oxidative species to cleave the highly stable C—F bonds from PFAS molecules (i.e., defluorination). Currently, most approaches are challenged by (1) slow parent compound decay, (2) limited extent of defluorination, (3) generation of harmful byproducts, and (4) high energy consumption. For example, electrochemical oxidation of PFAS has been demonstrated in bench scale settings and limited field applications. However, such methods have not been widely adopted due to the high energy consumption and generation of harmful byproducts such as perchlorate and bromate, which limits the scale and cost-effectiveness of such systems.

BRIEF SUMMARY

In view of the shortcomings of current systems and methods for defluorinating PFAS, there exists a need in the art for new systems and methods that are more efficient (e.g., systems that operate at reduced costs, allowing for widespread adoption and large-scale implementations). The present disclosure addresses these needs by providing systems and methods for destroying PFAS using ultraviolet ("UV")-generated hydrated electrons ($e_{aq}^-$) produced using sulfite. These systems and methods provide high-efficiency degradation of PFAS and may be implemented more efficiently than alternative systems and methods known in the art.

In some exemplary aspects, the disclosure provides a method for degrading PFAS compounds, comprising: providing a liquid containing one or more PFAS compounds; subjecting the liquid to a pre-treatment, wherein the pre-treatment comprises applying UV light and/or at least one oxidizing agent to the liquid; subjecting the liquid to a treatment, wherein the treatment comprises applying UV light and a sulfite; and optionally, subjecting the liquid to a post-treatment, wherein the post-treatment comprises applying an oxidizing agent. In some aspects, the liquid may be a high-concentration PFAS waste stream, e.g., produced as a result or byproduct of another remediation method. For example, the regeneration of spent ion exchange resin produces a spent regenerant liquid consisting of PFAS, salt, solvent, and co-contaminants. In some aspects, the PFAS waste stream may comprise: (1) ion exchange resin or synthetic media regenerant; (2) granular activated carbon ("GAC") regeneration residue; (3) exhaust from a nanofiltration and reverse osmosis treatment; (4) investigation-derived waste; (5) liquid generated from washing aqueous film-forming foam ("AFFF") delivery vehicles and firefighting systems; (6) liquid generated from other treatment processes such as soil washing and foam fractionation; and/or (7) unused AFFF solution.

In some aspects, the oxidizing agent applied in the pre-treatment and/or the post-treatment steps comprises hydrogen peroxide, persulfate, ozone, or a combination thereof. In some aspects, a first oxidizing agent may be applied in the pre-treatment step and a second oxidizing agent may be applied in the post-treatment step, and the first and second oxidizing agents may be independently selected.

In some aspects, the pH of the liquid is adjusted to at least, at most, about, or exactly 9, 9.5, 10, 10.5, 11, 11.5, 12, 12.5, 13, 13.5, or 14, or within a range bounded by any pair of the foregoing values, prior to or during the pre-treatment and/or treatment steps. The pH or pH range for each step may be selected independently.

In some aspects, the pre-treatment and treatment steps are repeated at least, at most, or exactly 1, 2, 3, 4, 5, 6, 7, 8, 9, or 10 times, or within a range bounded by any pair of these values.

In some aspects, the treatment and post-treatment steps are repeated at least, at most, or exactly 1, 2, 3, 4, 5, 6, 7, 8, 9, or 10 times, or within a range bounded by any pair of these values.

In some aspects, the UV light applied in the pre-treatment and/or the treatment steps is provided by a light source with a wattage independently selected from: at least, at most, or exactly 10, 20, 30, 40, 50, 60, 70, 80, 90, 100, 150, 200, 250, 300, 350, 400, 450, 500, 600, 700, 800, 900, 1000, 1100, 1200, 1300, 1400, 1500, 1600, 1700, 1800, 1900, 2000, 2100, 2200, 2300, 2400 or 2500 W, or a wattage within a range bounded by any pair of these values.

In some aspects, the liquid comprises wastewater contaminated with one or more PFAS compounds. In some aspects, the liquid was previously subjected to an ion exchange, GAC, or membrane filtration, soil washing, foam fractionation purification process. In some aspects, the liquid was generated from PFAS manufacturing processes or washing AFFF delivery equipment.

In some aspects, the treatment, pre-treatment, and/or post-treatment steps are each performed at a temperature of at least, at most, or exactly 20, 30, 40, 50, 60, 70, 80, 90, or 100° C., or a temperature within a range bounded by any pair of these values. The temperature or temperature range for each step may be selected independently.

In some aspects, the UV light is provided by a 10, 20, 30, 40, 50, 60, 70, 80, 90, 100, 150, 200, 250, 300, 350, 400, 450, 500, 600, 700, 800, 900, 1000, 1100, 1200, 1300, 1400, 1500, 1600, 1700, 1800, 1900, 2000, 2100, 2200, 2300, 2400 or 2500 W light source, or a light source with a wattage in a range bounded by any pair of these values. In some aspects, the UV light wavelength is 10, 25, 50, 75, 100, 125, 150, 175, 200, 225, 250, 275, 300, 325, 350, 375, or 400 nm, or a wavelength within a range bounded by any pair of these values. In some aspects, the UV light may be applied to the inside of a UV reactor tank for at least, at most, or exactly 1, 2, 3, 4, 5, 6, 7, 8, 9, 10, minutes, or for a time period bounded by any pair of these values.

In some aspects, the disclosure provides a system for degrading PFAS compounds. Such systems may be configured to perform any of the methods described herein. For example, a system according to the disclosure may comprise any of the elements and/or connections shown in the exemplary embodiment described by FIG. 1. In some aspects, a system according to the disclosure may include any combination of these elements, connected (e.g., by a pipe system) as arranged in this figure or in any other alternative arrangement.

In some aspects, a system for degrading PFAS compounds according to the disclosure may comprise a first storage tank containing a liquid contaminated with one or more PFAS; a UV reactor tank, in fluid communication with the first storage tank and configured to receive the liquid contained in the first storage tank, wherein the UV reactor tank includes a mixer configured to mix the received liquid; and a UV light source configured to apply a UV light to the received liquid inside of the UV reactor tank. In some aspects, the system may further comprise: a second storage tank configured to hold at least one oxidizing agent; and/or a third storage tank configured to hold at least one reducing agent; wherein the UV reactor tank is in fluid communication with and configured to receive: a) the at least one oxidizing agent from the second storage tank, and/or b) the at least one reducing agent from the third storage tank. In some aspects, the system may further comprise one or more heating elements configured to heat: a) the liquid contaminated with one or more PFAS, b) the at least one oxidizing agent, and/or c) the at least one reducing agent; prior to or when in transit to the UV reactor tank, or in the UV reactor tank.

In some aspects, the heating element may be configured to heat: a) the liquid contaminated with one or more PFAS, b) the at least one oxidizing agent, and/or c) the at least one reducing agent; to at least, at most, or exactly 20, 30, 40, 50, 60, 70, 80, 90, or 100° C., or a temperature within a range bounded by any pair of these values.

In some aspects, the at least one oxidizing agent comprises hydrogen peroxide, persulfate, ozone, or a combination thereof. In some aspects, the reducing agent comprises sodium sulfite. In some aspects, the catalyst comprises an iodide.

Systems according to the disclosure may further comprise one or more sensors, e.g., configured to detect or measure pH, temperature, liquid level, and/or ORP at one or more positions in the system, such as in one or more feed tanks, UV reactors, pipes, or other components of the system, The system may further comprise a control system configured to control or adjust the pH, temperature, liquid level, and/or ORP at one or more positions in the system (e.g., by opening/closing one or more valves to adjust the flow path of liquid in the system).

The above simplified summary of exemplary aspects serves to provide a basic understanding of the present disclosure. This summary is not an extensive overview of all contemplated aspects and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and particularly pointed out in the claims.

BRIEF DESCRIPTION OF THE FIGURES

The accompanying drawings, which are incorporated into and constitute a part of this specification, illustrate one or more example embodiments of the invention and, together with the detailed description, serve to explain their principles and implementations.

DETAILED DESCRIPTION

Figure 1:
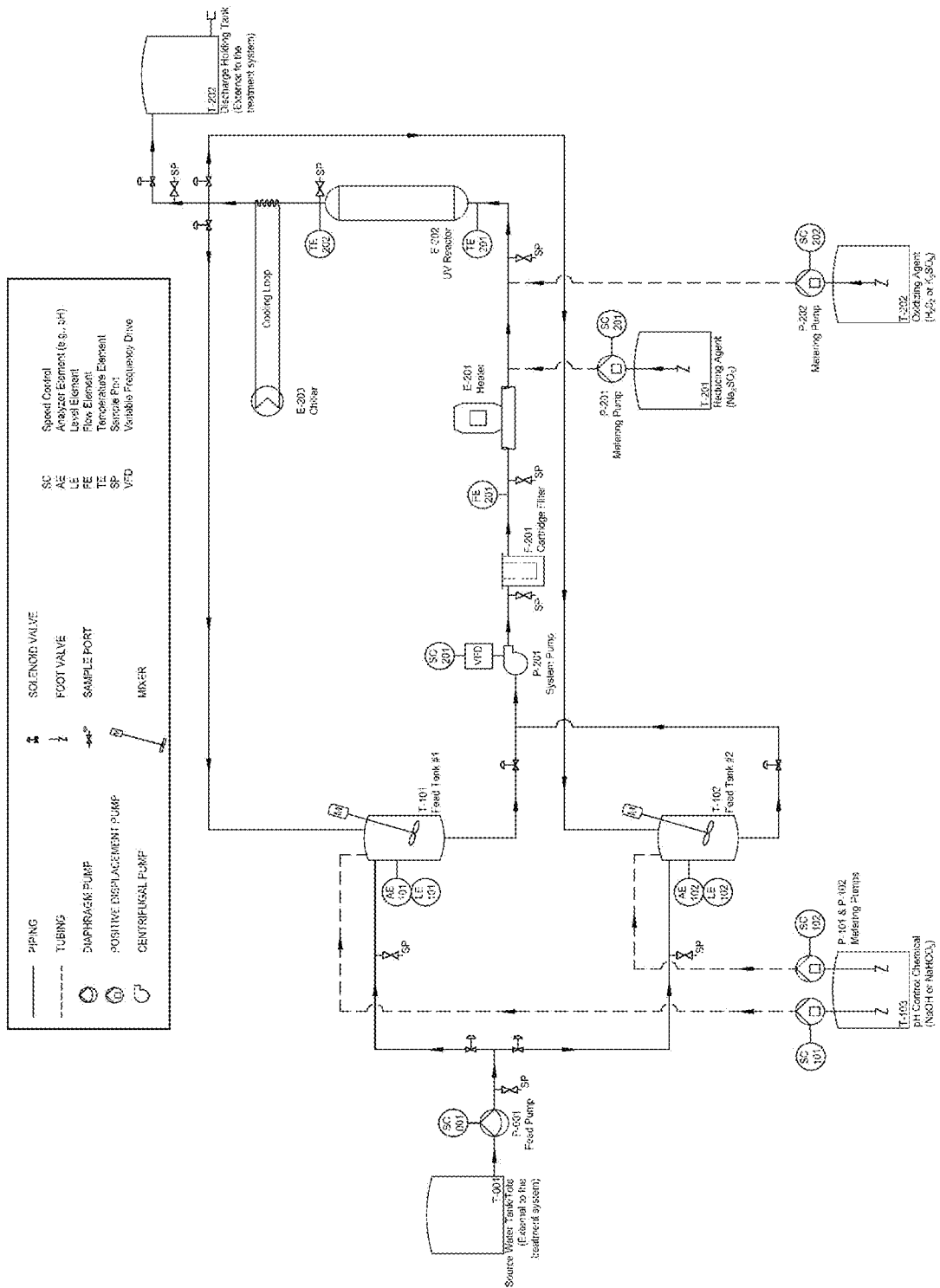
FIG. 1 shows an exemplary system for degrading PFAS using UV light and sulfite, in accordance with the present disclosure.

Systems and methods for degrading PFAS using UV light and sulfite in accordance with the disclosure are described in detail below. The following description includes references to the accompanying drawings. In the drawings, the same reference numeral is used to represent the same part or a corresponding part so as to avoid repeated explanation. Those of ordinary skill in the art will realize that the following description is illustrative only and is not intended to be in any way limiting. Other aspects will readily suggest themselves to those skilled in the art having the benefit of this disclosure.

PFAS comprise a group of man-made, fluorinated organic chemicals that include thousands of individual compounds. Given their unique physical and chemical properties, PFAS function in many capacities, including as surfactants, friction reducers, and repellents of water, dirt, and oil. As such, they are wildly used in our society, ranging from industrial applications such as fire-fighting foams and fume suppressant in chrome plating processes to consumer products such as textile, paper, and non-stick cookware. Those properties, however, also make them recalcitrant in the natural environment. PFAS have been found not only in food, water, groundwater, drinking water, soil, sediment, dust, and air, but also in the blood of more than 95% of the U.S. population. Research has found that PFAS exposure in humans is linked to cancer, obesity, elevated cholesterol, immune suppression, and endocrine disruption.

The ubiquitous occurrence of PFAS in the environment, links to toxic effects at low concentrations, and several high-profile court cases (such as the case documented in the 2019 film "Dark Waters"), have led to increased media and regulatory attention. In February 2020, the U.S. Environmental Protection Agency (EPA) announced a decision to regulate the two most studied PFAS compounds, i.e., perfluorooctanoic acid (PFOA) and perfluorooctane sulfonate (PFOS) in drinking water, moving closer to developing a maximum contaminant level (MCL) for these compounds. In the meantime, several states have published their own MCL or guidance values for PFAS. As of March 2022, 28 states have published a promulgated rule or advisory value for at least one PFAS compound in at least one environmental medium, and six states (MA, MI, NH, NJ, VT, WI) have issued final or proposed MCLs for multiple PFAS compounds.

One of the main sources of liability for PFAS is a result of the use of aqueous film-forming foam (AFFF). For example, it has been reported that the U.S. government is currently in the process of investigating thousands of sites potentially impacted by PFAS, given the historical use of AFFF and other PFAS-containing materials, and that there are tens of thousands of PFAS-impacted sites that require investigation and/or remediation. A recent report prepared by the Congressional Budget Office estimated that it will cost more than $5.6 billion dollars to address some of the U.S. government's AFFF liability incurred by government agencies to date.

To address this liability, government and private sector entities have an urgent need for innovative technologies to effectively remove PFAS from the environment. To date, the most widely applied methods for treating PFAS-contaminated groundwater and drinking water are separation technologies, including ex situ granular activated carbon (GAC), ion exchange, nanofiltration, and reverse osmosis (Stroo et al. 2017). Although these separation technologies have been demonstrated to be effective to a certain extent in removing PFOA and PFOS from groundwater, each process also generates one or more residue or concentrate streams that require further treatment. For instance, the regeneration of spent ion exchange resin produces a spent regenerant liquid consisting of PFAS, salt, solvent, and co-contaminants (Woodard, Berry, and Newman 2017).

Other PFAS waste streams include: 1) GAC regeneration residue, 2) waste from nanofiltration and reverse osmosis treatment, 3) investigation-derived waste, 4) liquid generated from washing AFFF delivery vehicles and firefighting system, 5) un-used AFFF solution, and 6) liquid generated from other remediation processes such as soil washing and foam fractionation. These waste streams contain high concentrations of PFAS and require careful management, which can substantially increase the overall cost of treatment (Stroo et al. 2017). Disposal at landfills or incineration of such concentrated PFAS waste streams can be cost-prohibitive and unsustainable (Stroo et al. 2017; EPA 2020). Accordingly, there is a dire need to develop a cost-effective and sustainable solution for treating PFAS in concentrated waste streams.

The present disclosure addresses this problem by providing systems and methods for degrading PFAS (and other co-contaminant such as chlorinated volatile organic compounds (CVOCs)) using UV-generated hydrated electrons ($e_{aq}^-$) produced from sulfite and oxidation pre- and post-treatment. A hydrated electron is an electron released when ionizing a molecule (e.g., a water molecule). It may be visualized as a free electron surrounded by a small number of oriented water molecules that behaves in some ways like a singly charged anion (Buxton et al. 1988; Grossweiner, Swenson, and Zwicker 1963). It can be generated from water or specific chemicals under UV irradiation (Grossweiner et al., 1963; Fischer and Warneck 1996). The hydrated electron is one of the most reactive species, with a standard reduction potential of about −2.9 volts (Buxton et al. 1988). It reacts rapidly with many species having more positive reduction potentials (Buxton et al. 1988). The hydrated electron has demonstrated excellent performance in cleaving carbon-fluoride (C—F) bonds and has been shown effective in defluorinating PFAS compounds such as PFOA (Song et al. 2013), PFOS (Gu et al. 2017), and GenX, a PFOA substitute (Bao et al. 2018). The hydrated electron is also the dominant reactive species in the plasma-based technology (Stratton et al. 2017) that was tested at the Wright-Patterson Air Force Base in Ohio for treating PFAS-impacted groundwater. Hydrated electrons can be produced with photoirradiation of solutes, including sulfite, iodide, dithionite, and ferrocyanide, and have been reported in literature to effectively decompose PFAS in water (Bentel et al. 2019; Cui, Gao, and Deng 2020; Huang, Dong, and Hou 2007; Buxton et al. 1988). Among the electron source chemicals, sulfite is the most effective and practical option for generating hydrated electrons to destroy PFAS in water. The mechanism of hydrated electron production in a solution of sulfite and under UV (denoted as hν) is shown in equation 1:

Under anoxic conditions, $SO_3^{\cdot-}$ is subsequently recombined through two parallel pathways to generate dithionite (equation 2) and sulfate (equation 3), respectively.

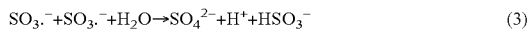

Meanwhile, the hydrated electron may be consumed by non-target mechanisms including i) the hydrated electron can be quenched by $H^+$ to produce H. radicals and $H_2$ gas (equations 4-6); ii) the hydrated electron may react with dithionite generated from equation 2 (equation 7) to regenerate sulfite; and iii) the hydrated electron can react with dissolved oxygen, when it is present, to produce superoxide (equation 8), which can further react with the hydrated electron (equation 9).

$$e_{aq}^- + H^+ \rightarrow H. \quad (4)$$

$$e_{aq}^- + H. + H_2O \rightarrow H_2 + OH^- \quad (5)$$

$$e_{aq}^- + e_{aq}^- + 2H_2O \rightarrow H_2 + 2OH^- \quad (6)$$

$$e_{aq}^- + S_2O_6^{2-} \rightarrow SO_3^{2-} + SO_3.^- \quad (7)$$

$$e_{aq}^- + O_2 \rightarrow O_2.^- \quad (8)$$

$$e_{aq}^- + O_2.^- \rightarrow O_2^= \quad (9)$$

Sulfite can be partially recycled from equations 2 and 7 to sustain the generation of hydrated electrons. The final photodecomposition products are sulfate and dithionite with a reported approximate sulfate to dithionite molar ratio of 2:1 (Cui, Gao, and Deng 2020).

Previous efforts to implement UV/sulfite systems have been challenging in view of the high energy consumption of UV lamps. For example, a previous study using a low-pressure 254 nm mercury lamp at pH 9.5, to study the decay of n≥2 perfluorocarboxylic acid (PFCAs, CnF2n+1COO—) found that parent compounds took 8-12 hours to degrade. The completion of a partial defluorination from those PFCAs required an even longer time of 24-48 hours. Higher intensity (e.g., using multiple 254 nm lamps) or higher energy UV irradiation (e.g., using medium-pressure lamps with a wide emission spectrum) could accelerate the reaction, but the energy consumption became even higher. As such, the methods of this study proved to be inefficient and not amenable to widespread or high-scale use.

Figure 4:
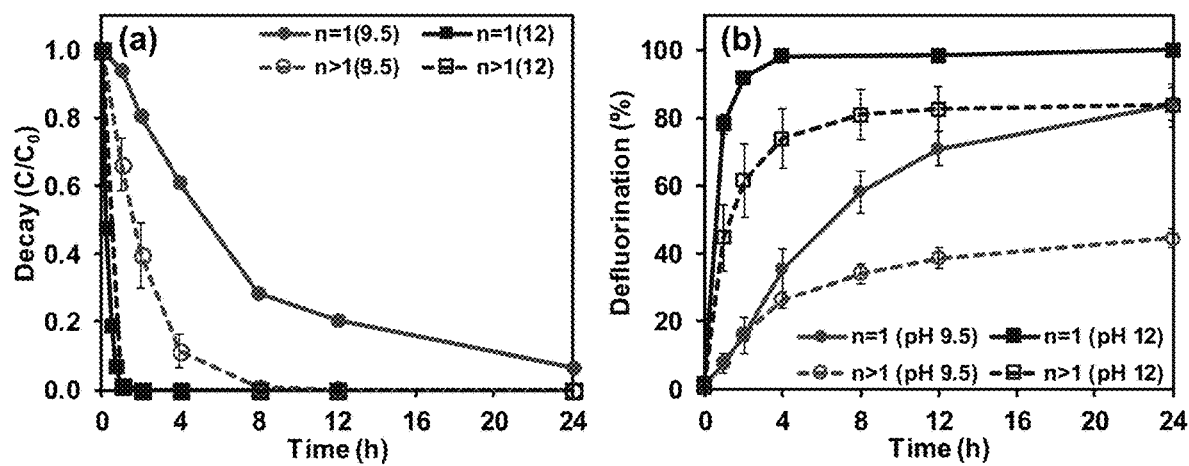
FIG. 4 includes a pair of graphs showing the substantially accelerated decay (panel a) and defluorination (panel b) from perfluorinated carboxylic acids (PFCAs) when the solution pH of UV/sulfite was increased from 9.5 to 12.0. These graphs are excerpted from Bentel, Michael J., et al. "Enhanced degradation of perfluorocarboxylic acids (PFCAs) by UV/sulfite treatment: Reaction mechanisms and system efficiencies at pH 12." *Environmental Science & Technology Letters* 7.5 (2020): 351-357 ("Bentel et al.," the entire contents of which is hereby incorporated by reference).
Figure 5:
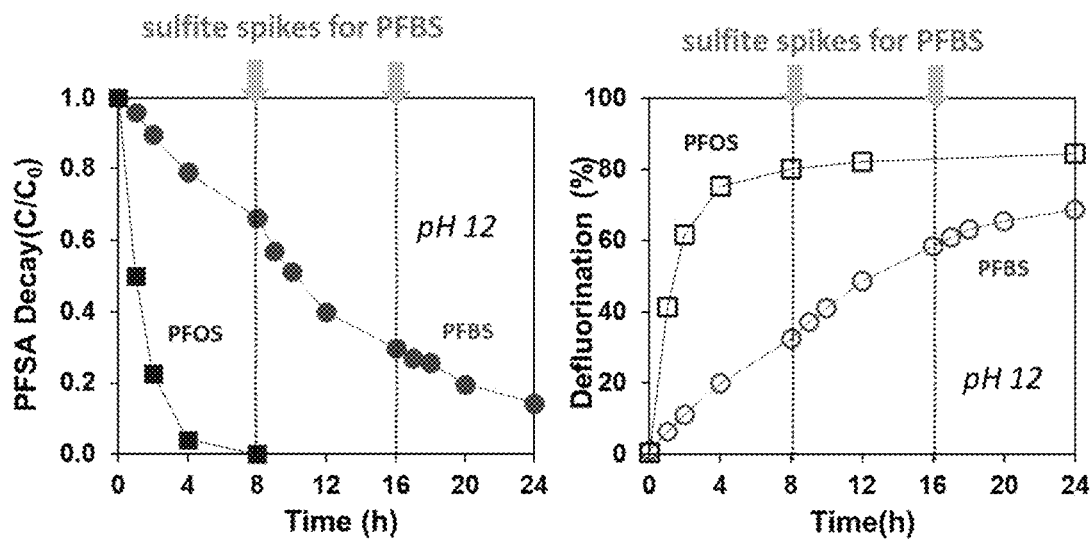
FIG. 5 includes a pair of graphs showing the substantially accelerated decay rate (panel a) and defluorination (panel b) of perfluoroalkane sulfonic acids (PFSAs), when the solution pH of the UV/sulfite was increased from 9.5 to 12.0.

The systems and methods described herein have addressed this shortcoming by substantially improving the efficiency of UV/sulfite-mediated degradation of PFAS through the use of alternative processing workflows and/or parameters. For example, in some aspects an oxidation pre-treatment mixing step is performed to transform recalcitrant PFAS precursor compounds into terminal PFAS compounds that are more amenable to destruction (e.g., as illustrated by FIG. 1, step 204). This pre-treatment step may also be performed to remove constituents such as organic matters in the liquid waste that will interfere with UV/sulfite reaction. A combination of UV/sulfite reactors and operation control units such as temperature control and pH adjustment system may be used to provide optimal reaction conditions that enable the effective breakdown of carbon-fluorine (C—F) bonds in various PFAS compounds. Any remaining C—F bonds (typically, a small fraction of <10%) can be further cleaved by applying another oxidizing agent as a post-treatment. The fluorotelomers can be first oxidized to perfluorocarboxylic acids (PFCAs), which can be effectively defluorinated by the UV/sulfite system regardless of the chain length. In some aspects, the present systems may be configured to enable alternate cycles of the oxidation and reduction processes, if necessary. The combination of advanced reduction and oxidation can achieve near-complete defluorination of all PFCAs (e.g., as shown by FIGS. 4 and 5) and telomeric acids (after pre-oxidation into PFCAs). The system may include a pH adjustment unit that can control the most critical factor influencing the rate and extent of defluorination, which is the solution pH. A high pH (e.g., ≥11) not only enhances the capability of the hydrated electron to cleave the very strong C—F bonds, but also alters the ratio of two competing reaction pathways toward the favorable defluorination pathway (Bentel et al. 2020b). Moreover, it has been found that short-chain (less than six carbon chain) fluorotelomers may be efficiently degraded by pre-treatment with an oxidizing agent before the UV/sulfite treatment.

Systems and methods for degrading PFAS compounds using hydrated electrons in a UV/sulfite system according to the present disclosure offer various advantages compared to other PFAS remediation technologies known in the art. Most notably, the present systems and methods provide a high defluorination rate: near 100% defluorination can be achieved for perfluorinated carboxylic acids (PFCAs), perfluoroalkane sulfonates, and fluorotelomer acids in various chain lengths by UV/sulfite combined with pre- and post-treatment using advanced oxidation. Furthermore, while the degradation efficiency for short-chain PFAS is challenging for technologies that rely on the aggregation of PFAS at the water-air or water-solid interface, the solution-phase UV/sulfite systems and methods of the present disclosure demonstrate excellent defluorination efficiency for both short- and long-chain PFAS. Unlike many oxidative technologies, hydrated electrons do not react with hydrocarbon compounds present in PFAS waste streams such as organic surfactants in aqueous film-forming foam (AFFF), thus preserving their reactivity for PFAS defluorination. The present systems and methods are also advantageous in that they require far less energy than known systems and generate no harmful byproducts. In particular, the electrical energy per order values for degrading PFCAs by UV/sulfite using the present systems is typically orders of magnitude lower than that for competing PFAS destruction technologies; and the process does not generate toxic byproducts such as perchlorate, chlorate, and bromate. Accordingly, the novel PFAS-degrading systems and methods described herein provide numerous benefits compared to known systems, which as noted above are typically energy-intensive and costly to implement and/or scale-up.

FIG. 1 shows an exemplary system for degrading PFAS using UV light and sulfite in accordance with the disclosure. As illustrated by this figure, such systems may comprise one or more subsystems, including e.g., a feed subsystem, a treatment subsystem, and a control subsystem, and various components, e.g., a discharge holding tank, a metering pump, and a cartridge filter.

The feed subsystem may include a diaphragm or positive-displacement pump capable of suction-lifting PFAS-laden liquid from an external tank, tote, truck, or other source, into one or more feed tanks. Each feed tank may be equipped with a mixer and a pH monitoring and control system to raise the liquid to an optimal pH.

The treatment subsystem may comprise a recirculation system in which the liquid is allowed to pass through a UV reactor and back to the feed tank(s) multiple times. A chemical addition subsystem may be incorporated into the treatment subsystem to add one or more oxidants or reductants prior to reaching the UV reactor. In addition, temperature monitoring sensors may be used to measure the temperature of the influent and effluent of the reactor, and may be used, e.g., to control heating or cooling elements (e.g., a chilled water loop) to control the temperature of liquids being processed by the system.

The control subsystem may comprise a computer and/or mechanical system for controlling one or more parameters of the PFAS degradation process carried out by the system. For example, the control subsystem may allow a user to set or adjust: (a) treatment pH; (b) flow rate, UV dose, and/or treatment time in the reactor; (c) temperature control of water exiting the reactor; (d) dosage and timing for one or more reductants/oxidants (e.g., to be added via the chemical addition subsystem); (e) monitored alarms and remote annunciation of any such alarms; and (f) monitored variables and frequency (e.g., the flow rate of the recirculation system, UV intensity, wavelength and/or frequency). It is contemplated that one or more liquid level, temperature, pH, and/or oxidation-reduction potential (ORP) sensors may be included at any point in the systems described herein (e.g., in any tank or reactor, or incorporated into piping used to transport liquid through the system). The control system may be configured to communicate (e.g., via a wired or wireless connection) with any such sensors, and to use data from the sensor(s) to determine whether to adjust any parameter(s). For example, the control system may be programmed to obtain pH level readings from one or more sensors placed at various positions within the system (e.g., in a feed tank or in the UV reactor) and to trigger the release (or adjust the level of) a pH modifying agent into the system in order to adjust the pH level to a preset value or range. In some aspects, temperature and/or ORP sensor data may be used in an analogous manner. It is understood that the control system may be programmed to maintain any of the temperature and/or pH levels (or ranges) disclosed herein, whether at a global level or at specific points/locations in the system.

Similarly, the control system may be configured to maintain a preset ORP level in one or more feed tanks, UV reactors, or other components of the systems described herein. For example, the control system may be configured to maintain an ORP level at or above a given threshold, or within a preset range, based on ORP level data collected from one or more ORP sensors. The ORP level can be adjusted, e.g., by triggering the release of (or an increase in) one or more reducing agents or oxidants disclosed herein, such as by opening/closing one or more valves. In some aspects, systems according to the disclosure may include a plurality of UV reactors (e.g., arranged in parallel or in series). In such aspects, the control system may be configured to maintain a independently selected ORP levels in each UV reactor (e.g., to target degradation of specific PFAS compounds or intermediate degradation products thereof).

As noted above, one or more liquid level sensors may also be used (e.g., installed in one or more feed tanks or UV reactors) to detect or measure the level of liquid present in these components. In some aspects, the control system may use liquid level data from any such sensors in order to determine whether to add more liquid to a feed tank, UV reactor, etc. The control system may adjust the liquid level by modifying the flow path of liquid in the system (e.g., by opening or closing one or more valves).

In some aspects, a system for degrading PFAS may comprise one or more feed tanks configured to store a liquid containing PFAS to be remediated (e.g., an initial waste stream, or a partially-remediated waste stream). The one or more feed tanks may be in direct or indirect fluid communication with one or more UV reactors configured to degrade PFAS compounds, or intermediate degradation products thereof, by applying UV light to the liquid. For example, a UV reactor may comprise a tank configured to receive a PFAS-containing liquid from a feed tank (or another source of a PFAS-containing waste stream), and to irradiate the PFAS-containing liquid using one or more UV lights positioned within a liquid-containing housing of the UV reactor. In some aspects, the housing of the UV reactor may include transparent or translucent sections and the UV light(s) may be positioned external to a liquid-containing housing of the UV reactor.

In some aspects, a single feed tank may have an output port connected to piping that connects to a single UV reactor, or which bifurcates and distributes liquid to several UV reactors. In some aspects, the system may comprise multiple feed tanks which output liquid to multiple UV reactors, e.g., through a piping system that connects the outputs from the multiple feed tanks into a single stream which may bifurcate and distribute liquid to the multiple UV reactors. Any of the feed tank(s) and/or UV reactor(s) may optionally include a mixer, e.g., to circulate liquid during storage and/or treatment.

The system may further comprise one or more tanks or configured to store and/or dispense a chemical agent, such as a catalyst (e.g., KI), a pH control agent (e.g., NaOH), an oxidizing agent (e.g., $K_2SO_8$), and/or a reducing agent (e.g., $Na_2SO_3$). In some aspects, a single tank may be used to store and/or dispense all of these chemical agents, or a subset thereof; in others, each chemical agent may be stored and/or dispensed from a dedicated tank. The chemical agent tanks may be used to introduce a chemical agent at any point in the system (e.g., such tank(s) may be placed in fluid communication with one or more feed tanks or UV reactors, or with the piping connecting any tank or reactor used in the system).

In some aspects, the system may include a control system comprising a processor and memory configured to store computer-executable instructions for monitoring and/or controlling one or more the PFAS remediation processes described herein. For example, the system may include one or more temperature and/or pH sensors at any position (e.g., in or on a feed tank, UV reactor, or any piping described herein), and one or more valves, pumps, or heat exchangers under the control of the control system. The control system may be configured to open/close any such valve, or to activate (or adjust the level of) any such pump or heat exchanger. For example, the control system may be configured to open a valve that controls dispensation of a pH control agent (e.g., an acid or base, or a buffer) from a storage tank in response to a pH sensor placed in or on a feed tank or UV reactor. Similarly, the control system may be configured to activate a heat exchanger, or to modify the flow path of liquid in the system (e.g., using one or more valves) to direct liquid to a heat exchanger, based on data from a sensor placed in or on a tank, UV reactor, or intervening piping. In some aspects, the control system may be configured to change the flow path of liquid in the system based on one or more timers (e.g., the system may be configured to close a valve associated with an output port of a UV reactor during the treatment process, and to open the port after a preset amount of time has passed).

In some aspects, a system for degrading PFAS may be configured as a mobile system. Such mobile systems may be configured to fit within an enclosure (e.g., for transport). In some aspects, the enclosure is designed to provide a single electrical hookup for all power needed in the system; and/or to provide complete heating, cooling, and ventilation for optimum treatment under various environmental conditions.

Figure 2:
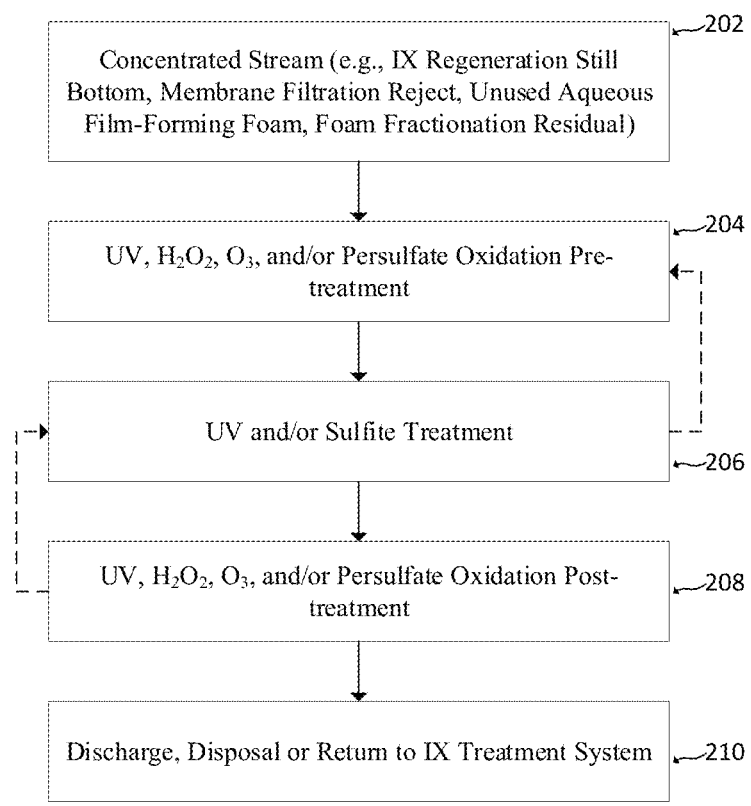
FIG. 2 shows an exemplary method for degrading PFAS using UV light and/or sulfite, in accordance with the present disclosure.

FIG. 2 illustrates an exemplary method for degrading PFAS compounds according to the disclosure. As shown by step 202 in this figure, such methods may utilize concentrated waste such as the still bottom from an ion exchange (IX) regeneration (or another concentrated stream containing PFAS compounds). A still bottom is a waste produced from the regeneration of saturated IX resin (e.g., by using a solution containing high salt content and methanol followed by distillation to remove the methanol). In other aspects, any PFAS-containing liquid may be processed using the systems described herein (e.g., contaminated wastewater collected at an industrial or other site, concentrate PFAS-containing liquid that has already been partially remediated using membrane filtration or another technique, PFAS-containing liquid generated from washing or cleaning of AFFF delivery equipment, PFAS-containing liquid that are generated from other remediation processes such as soil washing and foam fractionation). The liquid to be treated may be stored in a tank or other holding vessel (e.g., the source water tank shown in FIG. 1).

At step 204, the influent liquid may be subjected to an oxidative pre-treatment, e.g., using UV light, $O_3$, $H_2O_2$, and/or persulfate. This pre-treatment step is designed to transform some PFAS precursor compounds to terminal PFAS that are more amenable to destruction and to remove organic compounds to increase the efficiency of the subsequent UV/sulfite treatment. It is understood that (a) pre-treatment is optional, and (b) alternative oxidizers or pH adjustment chemicals may be used. Furthermore, the pre-treatment step may further comprise adjustment of the pH and/or temperature of the influent liquid. As shown by FIG. 1, this pre-treatment may be carried out using one or more feed tanks (e.g., feed tank 1 and 2 in this diagram), and optionally with a pH adjustment subsystem (e.g., the pH control tank connected to the feed tanks) or the UV reactor. In some aspects, the pre-treatment may comprise treating the influent liquid with $O_3$, $H_2O_2$, and/or persulfate at a concentration of 50-500 mmol/L (e.g., at a concentration of exactly, at least, or about 50, 75, 100, 125, 150, 175, 200, 225, 250, 275, 300, 325, 350, 375, 400, 425, 450, 475, or 500 mmol/L, or at a concentration within a range bounded by any of these values).

At step 206, the pre-treated liquid may be subjected to UV/sulfite treatment, wherein hydrated electrons are generated and used to defluorinate PFAS in the pre-treated liquid. As shown by FIG. 1, this treatment step may be carried out using a UV reactor connected to the pre-treatment equipment and a source of the sulfite (e.g., sodium sulfite as provided by the reducing agent tank shown in this figure). Optionally, a catalyst such as potassium iodide and sodium iodide can be added to the reactor, e.g., to expedite the PFAS defluorination in the presence of UV and sulfite. Optionally, treated liquid may be subjected to multiple rounds of pre-treatment 204 and treatment 206 steps (e.g., by recirculating treated liquid back to the feed tanks for pre-treatment one or more times). In some aspects, the pre-treatment and treatment cycles may be repeated at least, at most, or exactly 1, 10, 20, 30, 40, 50, 60, 70, 80, 90, or 100 times, or a number of times within a range bounded by any pair of the foregoing values. In some aspects, sodium dithionite may be used as replacement for the sulfite component, or as a supplemental reducing agent. Thus, it should be understood that any reference to use of a sulfite in the systems and methods described herein further contemplates embodiments wherein sodium dithionite is used in place or in addition to the sulfite.

After this treatment 206 (and optionally after one or more additional rounds of pre-treatment 204) the treated liquid may optionally proceed to a post-treatment wherein an oxidizing agent (e.g., persulfate, as in this example) is applied to the liquid to destroy residual PFAS compounds. In some aspects, the oxidizing agent may be provided by the same system used to supply the oxidizing agent used for the pre-treatment step. In some aspects, the post-treatment may comprise treating the influent liquid with $O_3$, $H_2O_2$, and/or persulfate at a concentration of 5-50 mmol/L (e.g., at a concentration of exactly, at least, or about 5, 7.5, 10, 12.5, 15, 17.5, 20, 22.5, 25, 27.5, 30, 32.5, 35, 37.5, 40, 42.5, 45, 47.5, or 50 mmol/L, or at a concentration within a range bounded by any of these values). As illustrated by FIG. 2, the treatment and post-treatment cycles may optionally be repeated one or more times. In some aspects, the treatment and post-treatment cycles may be repeated at least, at most, or exactly 1, 10, 20, 30, 40, 50, 60, 70, 80, 90, or 100 times, or a number of times within a range bounded by any pair of the foregoing values. Finally, at step 210 and treated (or post-treated) liquid may, e.g., be discharged to a sewer, disposed of or transferred to a treatment system for further processing. In some aspects, the liquid may be returned to an IX treatment system (e.g., for further remediation).

In some aspects, a catalyst may be used to improve the PFAS remediation process, e.g., by increasing or activating the production of hydrated electrons under UV light. Chemicals that can serve as a catalyst of the PFAS destruction by UV/sulfite include iodide, dithionite, and ferrocyanide. Chemical compounds that can produce soluble ions of iodide, dithionite, and ferrocyanide can be used as a catalyst to enhance this process. Example of such compounds include sodium iodide, potassium iodide, hydroiodic acid, sodium dithionite, potassium ferrocyanide. It is contemplated that one or more catalysts may be applied to the liquid being processed at any step in the methods described herein (e.g., during the pre-/post-treatment or treatment steps), or at any point in the systems described herein. For example, one or more catalysts may be applied at steps 202, 204, 206, 208, or 210.

In some aspects, the temperature and/or pH may be controlled at any step of the methods, or at any point of the systems, described herein. For example, the pH level of the liquid being remediated may be adjusted to at least, at most, exactly, or about 9, 9.5, 10, 10.5, 11, 11.5, 12, 12.5, 13, 13.5, or 14, or to a pH level within a range bounded by any of these values, during the pre-/post treatment or treatment steps described herein. Similarly, the temperature may be adjusted to at least, at most, exactly, or about 20, 30, 40, 50, 60, 70, 80, 90, or 100° C., or to a temperature within a range bounded by any pair of these values, during the pre-/post treatment or treatment steps described herein. The pH and/or temperature may be adjusted using a control system as described elsewhere herein.

Figure 3:
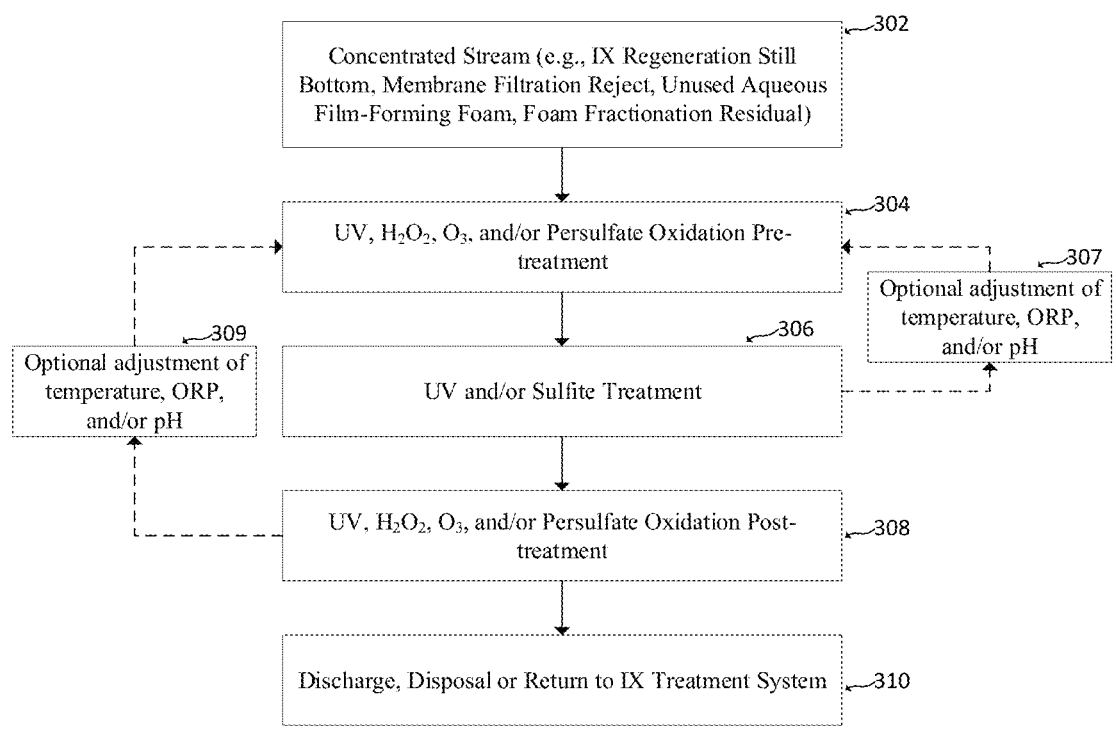
FIG. 3 shows an exemplary method for degrading PFAS using UV light and/or sulfite, in accordance with the present disclosure.

FIG. 3 illustrates another exemplary method for degrading PFAS compounds according to the disclosure. In this example, a concentrated stream containing one or more PFAS compounds is subjected to a pre-treatment step wherein UV light, $H_2O_2$, $O_3$, and/or persulfate oxidation is performed to at least partially degrade one or more of the PFAS compounds in the concentrated stream. Thus, steps 302 and 304 are analogous to steps 202 and 204, which are described in further detail above. In some aspects, the product of step 304 may proceed to a treatment step wherein UV light and/or a sulfite are used to further degrade the PFAS compound(s) and/or intermediate degradation products thereof (step 306), followed by a post-treatment step wherein UV light, $H_2O_2$, $O_3$, and/or persulfate oxidation is performed to further degrade one or more of the PFAS compounds, or degradation products thereof (step 308), followed by disposal of the end product, or further processing, e.g., by recirculation to an earlier stage of the treatment system (step 310). Thus, steps 306, 308, and 310 are analogous to steps 206, 208, and 210, which are described in further detail above. The processing workflow may include one or more steps wherein the temperature and/or pH of the liquid being processed is adjusted, e.g., after steps 306 or 308, as shown in this figure. In other aspects, the temperature and/or pH may be modified at any other step of the process (e.g., at step 302, 304, or 310). The temperature and pH may be adjusted at any point in the processing workflow to any level, threshold, or range disclosed herein.

It is understood that the concentration and/or amount of the compounds used to pretreat, treat, or post-treat the influent may be adjusted as needed for a given implementation. Similarly, while persulfate and hydrogen peroxide are shown as exemplary oxidizing agents, it is understood that other oxidizing agents may be used. It is further understood that the steps shown in FIG. 2 may be combined and/or reordered, and that any step(s) may be repeated one or more times (e.g., as described above with respect to the repetition of the pre-treatment and treatment cycle, and the treatment and post-treatment cycle).

The liquid being treated may be adjusted to any pH level during the process (e.g., using the pH control chemical shown in FIG. 1). As explained elsewhere herein, the pH level of the liquid during the treatment step impacts the rate of degradation of the PFAS compounds. In some aspects, the pH is at least or exactly 9, 10, 11, 12, 13, or 14 during the treatment step, or within a range bounded by any pair of the foregoing values.

Figure 10:
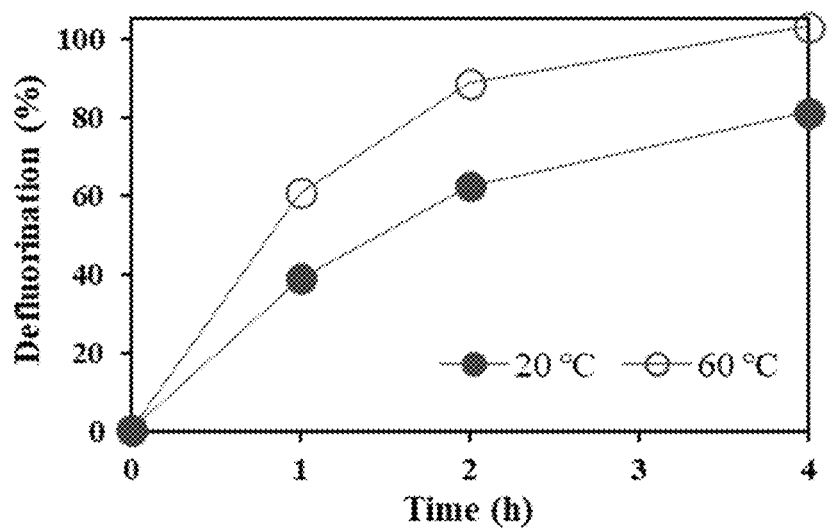
FIG. 10 is a graph showing the defluorination of PFOA at two different temperatures, i.e., at 20° C. and at 60° C.

As illustrated by FIG. 1, systems according to the disclosure may further comprise additional elements, e.g., pumps, and temperature modulating equipment. Cooling equipment (e.g., a cooling loop) may be particularly desirable when higher power UV lamps are used for the treatment step. The temperature of the liquid may be cooled during or prior to any of the steps of the methods described herein. For example, the liquid being processed may be chilled to 20, 30, 40, 50, 60, 70, 80, 90, or 100° C., or to a temperature within a range bounded by any of these values, during or prior to any of the steps shown in FIG. 2. Similarly, one or more heating elements may be used to raise the temperature during or prior to any of the steps of the methods described herein. For example, the liquid being processed may be heated to 20, 30, 40, 50, 60, 70, 80, 90, or 100° C., or to a temperature within a range bounded by any of these values, during or prior to any of the steps shown in FIG. 2. Elevated temperature is typically beneficial to PFAS destruction. A near 100% defluorination rate was achieved for PFOA, e.g., when the treatment step temperature was raised to 60° C., as shown by FIG. 10.

In the interest of clarity, not all of the routine features of the aspects are disclosed herein. It would be appreciated that in the development of any actual implementation of the present disclosure, numerous implementation-specific decisions must be made as the specific goals will vary for different implementations. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

All publications cited herein are expressly incorporated by reference in their entirety, even if not expressly stated in the citation. This incorporation by reference includes, e.g., any content in these publications that describes methodologies or parameters that might be used in connection with the systems and methods disclosed herein.

EXAMPLES

The following examples are non-limiting and merely illustrate selected aspects of systems and methods according to the present disclosure.

Example 1

Figure 6:
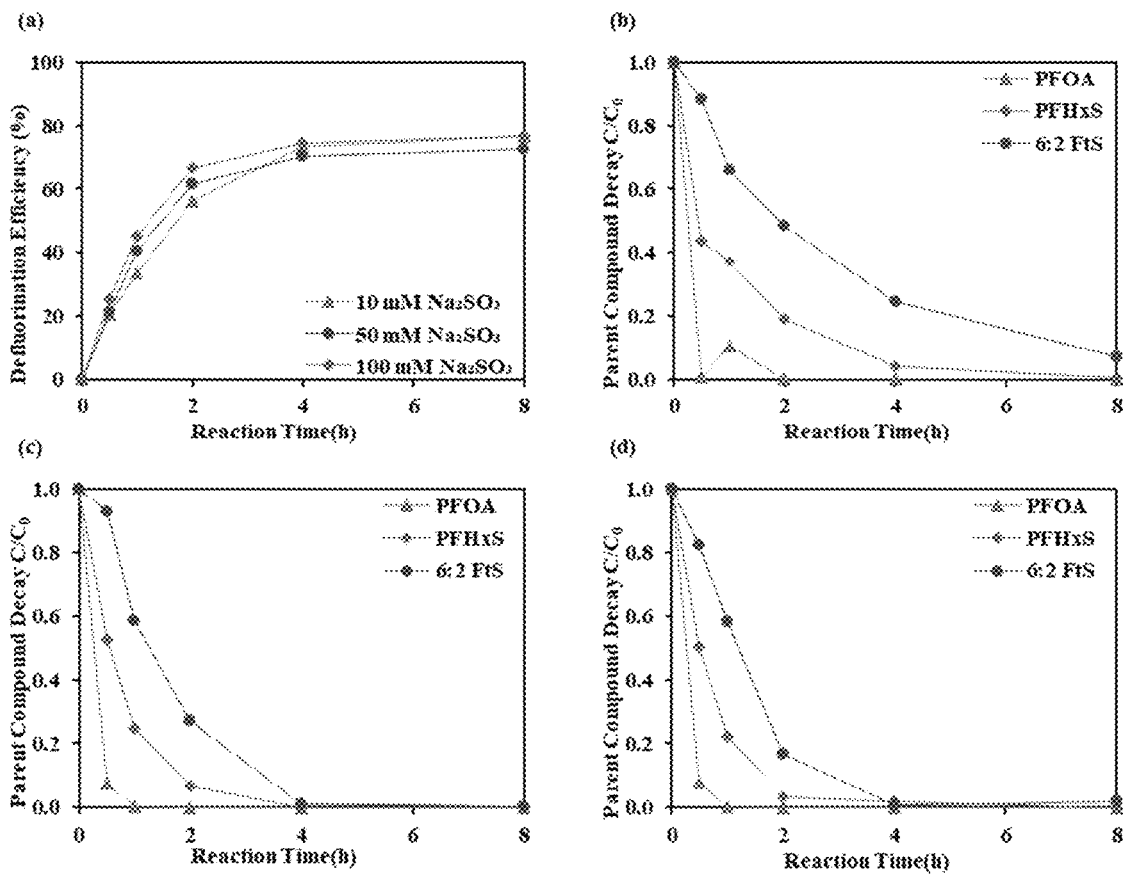
FIG. 6 includes a set of graphs showing the defluorination of a mixture of PFAS in simulated ion exchange regeneration residue, with graph (a) showing the defluorination efficiency, and graphs (b)-(d) showing the parent compound decay using 10, 50, and 100 mM Na2SO3, respectively.

Laboratory tests were conducted to evaluate PFAS reduction efficiency in a simulated ion exchange regeneration brine containing high concentrations of PFOA, PFOS, perfluorohexane sulfonate, and 6:2 fluorotelomer sulfonate. The results have shown that near 100% parent compound destructions and 75% defluorination can be achieved within four hours. The results of this study are illustrated by FIG. 6. This figure shows the defluorination of a mixture of PFAS pollutants in simulated ion exchange regeneration residue, with graph (a) showing the defluorination efficiency, and graphs (b)-(d) showing the parent compound decay using 10, 50, and 100 mM Na2SO3, respectively. Reaction conditions were as follows: 1200 W UV lamp; Initial pH 12; 1M NaCl brine matrix; starting PFAS concentrations include [PFOS]0=100 mg/L; [PFHxS]0=100 mg/L; [6:2 FtS]0=50 mg/L; ending temperature (at steady state of heat generation/dissipation)=50° C.

Example 2

Laboratory tests have been conducted to evaluate PFAS reduction efficiency at different pH levels. For example, in a paper by Bentel et al., substantially accelerated decay and defluorination of PFCAs was observed when the solution pH of UV/sulfite was increased from 9.5 to 12.0. A portion of the first figure in this paper is reproduced in the present application as FIG. 4. Note that the n=1 CF3COO$^-$ has a distinctively high recalcitrance to parent compound decay but allows 100% defluorination. Reactions were conducted with a 10 W or 18 W (same geometry, and no difference in PFCA degradation performance) UV lamp at 20° C. (maintained by cooling water circulation). For n>1, the average data for n=2-8 were plotted. When the 10 W lamp was used, the Electrical Energy per Order (EEO) for PFCA degradation were below 10 kWh m$^{-3}$.

Similarly, as shown by FIG. 5 a substantially accelerated decay rate (left graph) and defluorination (right graph) was observed for perfluoroalkane sulfonic acids (PFSAs), when the solution pH of the UV/sulfite was increased from 9.5 to 12.0. The reaction conditions for this test were as follows: pH=12 adjusted with NaOH; [PFOS]0=12.5 mg/L and

[PFBS]0=7.5 mg/L (both at 25 µM); a 18 W low-pressure 254 nm UV lamp was used, cooled to 20° C. by cooled water circulation for up to 24 h.

These results demonstrate that the substantially accelerated reaction kinetics produced by the present disclosed systems and methods reduce the need for electricity (i.e., consumed by UV lamps). Energy efficiency and defluorination performance can be further improved with multiple modifications of reaction conditions (e.g., pH, temperature, reaction time).

Example 3

Figure 7:
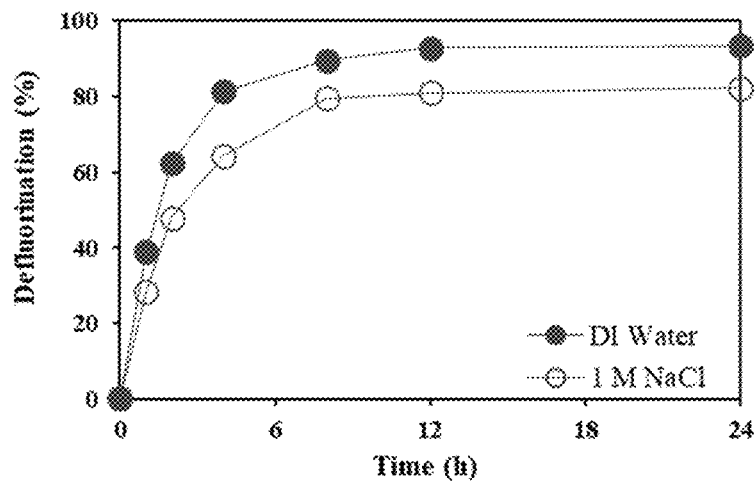
FIG. 7 is a graph showing defluorination of perfluorooctanoic acid (PFOA) in deionized (DI) water and 1 M NaCl at pH 12.
Figure 8:
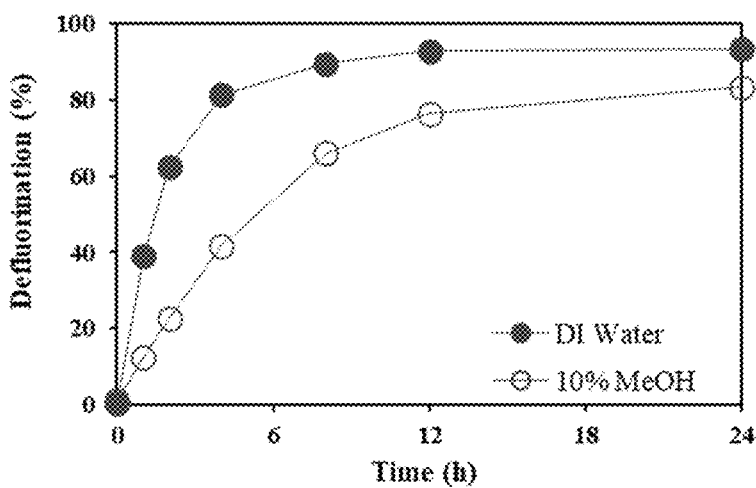
FIG. 8 is a graph showing defluorination of PFOA in DI water and 10% MeOH.

Laboratory tests were conducted to evaluate PFAS reduction efficiency when the treated liquid contained high concentrations of sodium chloride brine or methanol, two common solvents found in IX regeneration solution. As illustrated by FIGS. 7 and 8, these solvents had minor impact on the degradation rate of PFAS compounds using the present systems. PFAS degradation and defluorination performance can be further improved with multiple modifications of reaction conditions (e.g., pH, temperature, reaction time). FIG. 7 shows the results of a study that tested the defluorination of PFOA in DI water and 1 M NaCl and FIG. 8 shows the results of a similar study that tested the defluorination of PFOA in DI water and 10% MeOH. In both cases, the reaction conditions were as follows: 0.025 mM PFOA (~10 mg/L), 10 mM Na2SO3, 5 mM NaHCO$_3$, with an 18 W UV lamp cooled to 20° C.

Example 4

Figure 9:
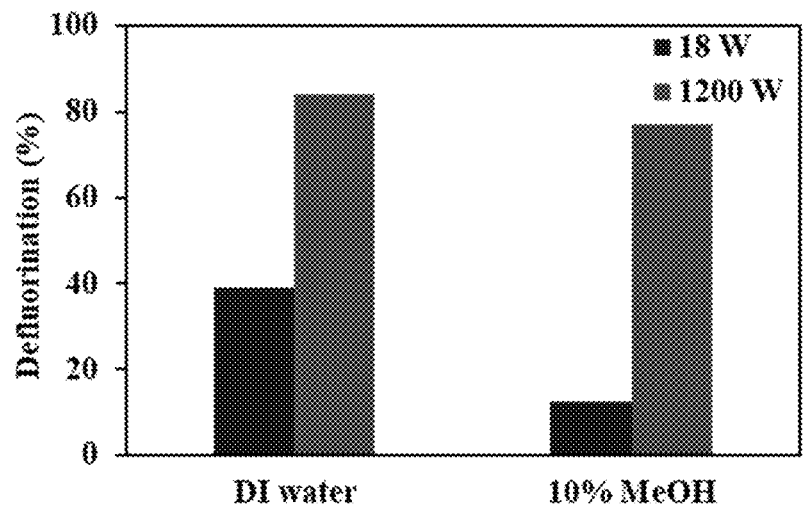
FIG. 9 is a graph showing enhanced defluorination of PFOA by using a 1200-W high-pressure lamp versus an 18-W low-pressure lamp.

Laboratory tests were conducted to evaluate PFOA reduction efficiency by using a 1200-W high-pressure lamp versus an 18-W low-pressure lamp. Reaction condition were as follows: 0.025 mM PFOA, 10 mM Na2SO3, 5 mM NaHCO$_3$, initial pH=12, reaction time 1 hour. As illustrated by FIG. 9, the 1200 W high-pressure lamp significantly accelerate the PFAS destruction process and achieved greater defluorination.

Example 5

Laboratory tests were conducted to evaluate PFAS reduction when the treatment was performed at an elevated temperature (20° C. vs. 60° C.). As shown by FIG. 10, elevated temperature improves the rate of PFAS degradation. A near 100% defluorination rate was achieved for PFOA when the reaction temperature was raised to 60° C. The reaction conditions for this experiment were as follows: 0.025 mM PFOA, 10 mM Na2SO3, 5 mM NaHCO$_3$, 18 W UV lamp, initial pH=12.

Example 6

Figure 11:
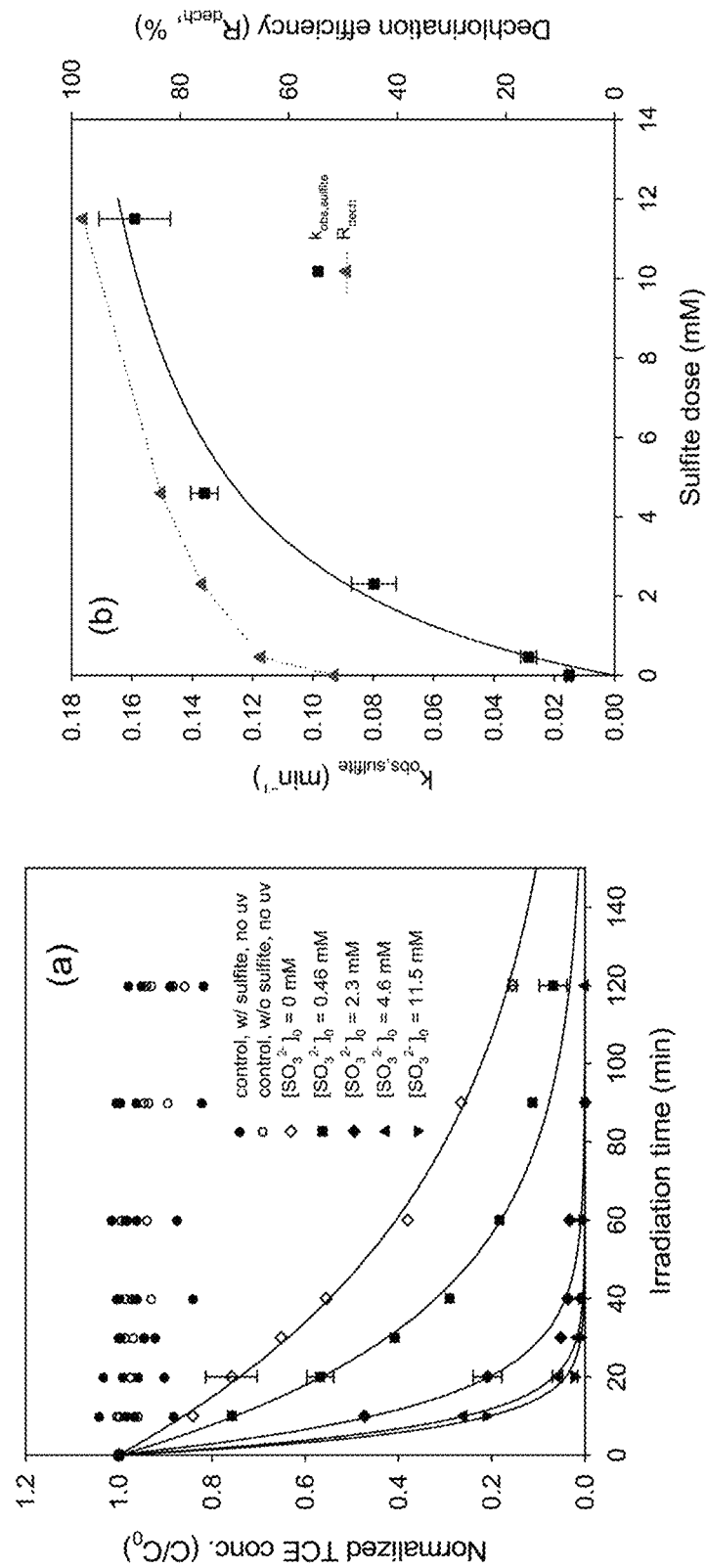
FIG. 11 includes two graphs showing the reduction of trichloroethylene (TCE), a common PFOA co-contaminant, using methods according to the present disclosure.

Laboratory tests were conducted to evaluate reduction of a common co-contaminant, trichloroethylene (TCE), when the treatment was performed at an room temperature (25° C.). As shown by FIG. 11, TCE can be destroyed effectively within two hours in a UV/sulfite system. A near 100% destruction of TCE can be achieved within 60 minutes with an initial concentration of 4.6 mM Na2SO3. The reaction conditions for this experiment were as follows: 0.23 mM TCE, 0.1 M phosphate buffer (pH 7.0 buffer BDH®), five 8 W UV lamps.

The invention claimed is:

1. A system for degrading a per- or poly-fluoroalkyl substance (PFAS), comprising:
   a first storage tank containing a liquid contaminated with one or more PFAS;
   a UV reactor tank, in fluid communication with the first storage tank and configured to receive the liquid contained in the first storage tank; and
   one or more UV light sources, each configured to apply a UV light to the received liquid inside of the UV reactor tank;
   a second storage tank containing at least one oxidizing agent;
   a third storage tank containing at least one reducing agent; and
   a fourth storage tank containing at least one pH control chemical;
   wherein the UV reactor tank is in fluid communication with and configured to receive: a) the at least one oxidizing agent from the second storage tank, b) the at least one reducing agent from the third storage tank, and c) the at least one pH control chemical from the fourth storage tank.

2. The system of claim 1, wherein the system further comprises one or more heating elements configured to heat: a) the liquid contaminated with one or more PFAS, b) the at least one oxidizing agent, and/or c) the at least one reducing agent; prior to or when in transit to the UV reactor tank, or in the UV reactor tank.

3. The system of claim 2, wherein the one or more heating elements are configured to heat:
   a) the liquid contaminated with one or more PFAS, b) the at least one oxidizing agent, and/or c) the at least one reducing agent;
   to 40 to 90° C.

4. The system of claim 2, wherein the heating element is configured to heat:
   a) the liquid contaminated with one or more PFAS, b) the at least one oxidizing agent, and/or c) the at least one reducing agent;
   to a temperature of 40 to 90° C.

5. The system of claim 1, wherein the at least one oxidizing agent comprises hydrogen peroxide, persulfate, ozone, or a combination thereof.

6. The system of claim 1, wherein the at least one reducing agent comprises sodium sulfite.

7. The system of claim 1, wherein the system further comprises a fifth storage tank containing at least one catalyst, said catalyst comprising an iodide salt; and
   wherein the UV reactor tank is in fluid communication with and configured to receive the catalyst from the fifth storage tank.

8. The system of claim 1, wherein the one or more UV lights have a combined wattage of at least 80 W.

9. The system of claim 1, wherein the UV light has a wavelength of 200 to 300 nm.

10. The system of claim 1, wherein the system is configured to apply the UV light to the inside of the UV reactor tank for at least, at most, or exactly 4, 8, 12, 16, 20, or 24 hours, minutes, or for a time period within a range bounded by a pair of endpoints, wherein the endpoints are independently selected from 4, 8, 12, 16, 20, or 24 hours.

11. The system of claim 1, wherein the system further comprises
   one or more feed tanks connected to and configured to receive the liquid from the first storage tank, wherein each of the one or more feed tanks optionally includes a mixer or a heating element; and wherein the UV reactor tank is connected to and/or configured to receive the liquid from the one or more feed tanks.

12. The system of claim 11, wherein the fourth storage tank is connected to and in fluid communication with: a) the first storage tank; b) the one or more feed tanks; and/or c) the UV reactor tank; and wherein the pH control fourth storage tank comprises and is configured to dispense the at least one pH control agent.

13. The system of claim 11, wherein the system further comprises piping that directly or indirectly connects an output port of the UV reactor tank to: a) the first storage tank; b) the one or more feed tanks; and/or c) an input port of the UV reactor tank.

14. The system of claim 1, wherein the UV light has a wavelength of 225 to 275 nm.

15. The system of claim 1, wherein the pH control chemical is NaOH.

16. The system of claim 1, wherein the system is configured to
pre-treat the liquid contaminated with the one or more PFAS with the oxidizing agent to produce an oxidized product,
treat the oxidized product using UV light in the UV reactor tank to produce a first PFAS degradation product; and then
contact the first PFAS degradation product with UV light and the reducing agent to produce a second PFAS degradation product.

17. The system of claim 16, wherein the system is further configured to treat the second PFAS degradation product by applying UV light to the second degradation product in the UV reactor tank, thereby forming a third PFAS degradation product.

18. The system of claim 16, wherein the system is further configured to treat the second PFAS degradation product by causing the oxidizing agent to come in contact with the second PFAS degradation product in the UV reactor tank, while UV light is applied, thereby forming a third PFAS degradation product.

19. The system of claim 1, wherein the at least one oxidizing agent comprises hydrogen peroxide.

20. The system of claim 1, wherein the at least one oxidizing agent comprises a persulfate.

21. A system for degrading a per- or poly-fluoroalkyl substance (PFAS), comprising:
a first tank containing a liquid contaminated with one or more PFAS; and
a UV reactor tank, in fluid communication with the first tank and configured to receive the liquid contained in the storage tank, comprising (a) one or more UV light sources, each having a wavelength in the range of 200-300 nm, and (b) one or more heating elements configured to heat the received liquid to a temperature within the range of 40-90° C.; and
a mixer, configured to circulate liquid between the first tank and the UV reactor tank;
wherein the first tank is configured to dispense at least one oxidizing agent, at least one reducing agent, and at least one pH control chemical into liquid contained in the first tank; and
wherein the first tank and the UV reactor tank are contained within a single enclosure.

22. The system of claim 21, wherein the first tank is further configured to dispense at least one catalyst, said catalyst comprising an iodide salt.

23. The system of claim 21, wherein the at least one oxidizing agent comprises hydrogen peroxide.

24. The system of claim 21, wherein the at least one oxidizing agent comprises a persulfate.

25. The system of claim 21, wherein the at least one reducing agent comprises a sulfite.

26. A system for degrading a per- or poly-fluoroalkyl substance (PFAS), comprising:
a UV reactor tank, configured to receive a liquid contaminated with one or more PFAS,
one or more UV light sources configured to generate light within the UV reactor tank at a wavelength in a range of 200-300 nm, and
one or more heating elements configured to heat the received liquid to a temperature within a range of 40-90° C.; and
wherein the UV reactor tank is configured to
pre-treat the received liquid by exposing the liquid to at least one first oxidizing agent in the presence of the UV light generated by the one or more UV light sources, thereby producing a liquid containing a first PFAS degradation product;
treat the liquid containing the first PFAS degradation product by exposing the liquid to at least one sulfite compound in the presence of the UV light generated by the one or more UV light sources, thereby producing a liquid containing a second PFAS degradation product; and
post-treat the liquid containing the second PFAS degradation product by exposing the liquid to at least one second oxidizing agent, which may be the same as the first oxidizing agent, in the presence of the UV light generated by the one or more UV light sources, thereby producing a liquid containing a third PFAS degradation product.

27. The system of claim 26, wherein the UV reactor tank, the one or more UV light sources, and the one or more heating elements, are positioned within a single enclosure.

* * * * *